United States Patent [19]
Boccuzzi et al.

[11] Patent Number: 5,786,725
[45] Date of Patent: Jul. 28, 1998

[54] REDUCED COMPLEXITY MAXIMUM LIKELIHOOD MULTIPLE SYMBOL DIFFERENTIAL DETECTOR

[75] Inventors: Joseph Boccuzzi, Brooklyn, N.Y.; Paul Petrus, Blacksburg, Va.

[73] Assignee: Lucent Technologies Inc., Murray Hill, N.J.

[21] Appl. No.: 777,310

[22] Filed: Dec. 27, 1996

[51] Int. Cl.$^6$ .................................. H04L 27/233
[52] U.S. Cl. .................... 329/304; 329/310; 375/283; 375/330; 375/324
[58] Field of Search ..................... 329/304, 310; 375/283, 330, 324

[56] References Cited

U.S. PATENT DOCUMENTS 5,550,506  8/1996  Tsumura ........................ 329/304

OTHER PUBLICATIONS

D. Divsalar and M.K. Simon, "Multiple–Symbol Differential Detection of MPSK," IEEE Trans. on Comm., vol. 38, No. 3, Mar. 1990, pp. 300–308.
C.C. Powell and J. Boccuzzi, "Performance of π/4–QPSK Baseband Differential Detection Under Frequency Offset Conditions," IEEE Globecom 1991, pp. 526–530.

Primary Examiner—Siegfried H. Grimm

[57] ABSTRACT

A reduced complexity maximum likelihood multiple symbol differential detector which utilizes a maximum likelihood sequence estimation of the transmitted phase and does so by expanding the observation window to observe the received symbol over N signal intervals and making a simultaneous decision on N-1 symbols. The phase of the received signal is calculated up front and thus the detector requires only real subtractions and real additions as opposed to complex multiplications and additions. Furthermore, the detector does not sacrifice performance over conventional prior art detectors.

18 Claims, 3 Drawing Sheets

REDUCED COMPLEXITY MAXIMUM LIKELIHOOD MULTIPLE SYMBOL DIFFERENTIAL DETECTOR

FIELD OF THE INVENTION

The invention relates to non-coherent differential detectors used in modulation schemes which utilize differential encoding, and more particularly to a reduced complexity maximum likelihood multiple symbol differential detection scheme and apparatus therefor.

BACKGROUND OF THE INVENTION

A common conventional modulation scheme used in digital communications systems is known as quadrature phase shift keying, or QPSK. In QPSK, the data to be transmitted is represented as an absolute phase position and thus requires recovery of a coherent carrier phase reference at the receiver/demodulation end to perform the detection function and thereby convert the transmitted signal back to digital data. It is difficult, however, to obtain an accurate carrier phase reference in fast, time varying channels, such as wireless communication channels, in order to perform coherent detection.

Thus, alternative modulation schemes have been developed which utilize differential encoding of the transmitted signal. In such schemes, the digital data to be transmitted is encoded in terms of differential phase shifts instead of absolute phase positions. Examples of such differentially encoded modulation schemes include differential quadrature phase shift keying, or DQPSK, and $\pi/4$ differential quadrature phase shift keying, or $\pi/4$-DQPSK. DQPSK and $\pi/4$-DQPSK are well known in the art, and thus will not be described in detail here. Differentially encoded modulation schemes require differential detection at the receiver/demodulation end in order to convert the differentially encoded transmitted signal back into the digital data, also known as a symbol. A phase state mapping table for $\pi/4^-$ DQPSK is shown below in Table I.

TABLE I $\pi/4$-DQPSK Phase State Mapping Table

| Phase Shift ($\Delta\phi$) | Transmitted Symbol |
|---|---|
| $\pi/4$ | 00 |
| $3\pi/4$ | 01 |
| $-\pi/4$ | 10 |
| $-3\pi/4$ | 11 |

FIG. 1A is a block diagram of a conventional transmitter 1 used to create and transmit a differentially encoded signal which, for illustrative purposes, is a $\pi/4$-DQPSK signal. The transmitter 1 consists of a serial-to-parallel converter 2 for generating odd and even bit streams X and Y and $\pi/4$-DQPSK modulator 3 for producing the quadrature components I and Q of the $\pi/4$-DQPSK signal. The I and Q quadrature components are filtered by SRC filters 4 prior to being transmitted.

FIG. 1B is a block diagram of a conventional receiver 5. The receiver 5 consists of SRC filters 6 that match filters 4 of the transmitter 1 and detector 7 which is able to implement various detection schemes as described herein, including that of the present invention, to convert the differentially encoded signal, illustratively a $\pi/4$-DQPSK signal, back into the original data. Parallel to serial converter 8 converts the detected parallel data into a serial bit stream.

To aid in the description of both the prior art and the preferred embodiments of the invention, each is described with respect to schematic representations thereof shown in the FIGS. 2–4. These schematic representations show the various operations utilized in the prior art and the preferred embodiments of the invention as discrete elements such as complex multipliers, real and complex adders and subtractors, and time delays that manipulate electrical signals. It should be understood, however, that these schematic representations are used to help illustrate the prior art and the preferred embodiments of the invention and that the invention can be implemented in both hardware and software in many ways without deviating from the scope thereof.

Referring to FIG. 2, a conventional differential detector, or CDD, that would be implemented in the receiver of FIG. 1B as described above is shown. In the CDD, the phase of the input signal during the present signal interval is compared to the phase of the input signal during the previous signal interval. As shown in FIG. 2, the input signal is delayed for one signal interval, or $T_s$, and is used as a reference to demodulate the input signal received during the next signal interval. The signal interval $T_s$ is the time interval at which respective differentially encoded signals are transmitted, each respective signal corresponding to a symbol. Of course, the specific $T_s$ signal interval will depend upon the specific modulation scheme utilized.

In particular, referring to FIG. 2, input signal 10, represented by $e^{j\Theta(t)}$, is fed both to complex multiplier 15 and time delay element 20. Time delay element 20 delays the input signal 10 by an amount equal to the signal interval $T_s$, to produce a signal 25 represented by $e^{j\Theta(t-T_s)}$. The conjugate of signal 25 is then taken to produce signal 30, which is represented by $e^{-j\Theta(t-T_s)}$. The signal 30 is then fed to the complex multiplier 15 to produce output signal 35, represented by $e^{j[\Theta(t)-\Theta(t-T_s)]}$. Thus, output signal 35 has a phase equal to the phase change between the signal in the present signal interval and the signal in the previous signal interval. This information can then be used, depending upon the specific differential encoding scheme used, to determine the digital data, or symbol, that corresponds to the signal in the present signal interval.

Thus, if $\pi/4$-DQPSK is used as the modulation scheme and if the CDD detects a phase change equal to $3\pi/4$, then, as shown in Table I, the signal received during the present signal interval will be determined to correspond to the symbol 01. It should be understood that $\pi/4$-DQPSK is used only for illustrative purposes and that the CDD functions substantially identically for other types of differentially encoded modulation schemes.

Differential detection using a CDD is known as symbol-by-symbol or two symbol detection because the present received phase is compared to the previous received phase to output a single symbol corresponding to the present received signal. Such differential detection is said to use a two symbol observation window.

In D. Divsalar and M. K. Simon, "Multiple-Symbol Differential Detection of MPSK," IEEE Trans. on Comm., Vol. 38, No. 3, March 1990, pp. 300–308, the authors proposed lengthening the observation window over which symbol decisions are made while at the same time making joint decision on several symbols. Lengthening the observation window provides improved performance which compensates for the performance penalty that results from differentially encoding the transmit data, as described above, to overcome the difficulty in establishing a coherent phase reference. The detection process proposed by the authors, hereinafter referred to as the Conventional Maximum Likelihood Multiple Symbol Differential Detector, or CMLMSDD, uses a maximum likelihood sequence estimation, or MLSE, of the transmitted phases. For illustrative purposes, the CMLMSDD is depicted in FIG. 3 using a $\pi/4$-DQPSK modulation scheme. It should be understood, however, that the CMLMSDD is equally applicable to other types of differentially encoded modulation schemes.

Referring to FIG. 3, the CMLMSDD takes as its input the differentially encoded transmitted signal 36, represented by $e^{j\Theta(t)}$. In the CMLMSD, CDD SA and CDD SB, as outlined in dotted lines in FIG. 2, are provided in succession. Thus, the output of CDD 5A is a signal 37 represented by $e^{j[\Theta(t)-\Theta(t-T_s)]}$ where $\Theta(t)-\Theta(t-T_s)$ is referred to as $\Delta\Phi_{k-1}$. In other words, the output of CDD 5A is a signal 37 whose phase, or $\Delta\Phi_{k-1}$, is equal to the phase change between the signal at time $t-T_s$ and the signal at the time t. Similarly, the output of CDD SB is a signal 38 represented by $e^{j[\Theta(t-T_s)-\Theta(t-2T_s)]}$ where $\Theta(t-T_s)-\Theta(t-2T_s)$ is referred to as $\Delta\Phi_k$. In other words, the output of CDD 5B is a signal 38 whose phase, or $\Delta\Phi_k$, is equal to the phase change between the signal at time $(t-2T_s)$ and the signal at time $(t-T_2)$. Thus, in summary, CDD 5A and CDD 5B are used to detect the phase difference between the present transmitted signal and the previous transmitted signal and the phase difference between the previous transmitted signal and the next previous transmitted signal, respectively.

As shown in FIG. 3, a detector 40 is also provided. The detector 40, outlined in dotted lines, includes the two time delay elements 20A and 20B of CDD 5A and CDD 5B, respectively, a complex multiplier 15C, and an element 42 which outputs the conjugate of the signal output by time delay element 20B. Thus, the output of the detector 40 is a signal 39 represented by $e^{j[\Theta(t)-\Theta(t-2T_s)]}$. In other words, the output of detector 40 is a signal 39 whose phase equals $(\Delta\Phi_k + \Delta\Phi_{k-1})$, the phase difference between the input signal at time t and the input signal at time $(t-2T_s)$.

The output signal 37 of CDD 5A is fed into a bank 45 of M complex phaser multipliers, where M equals the possible number of phase states for the particular differentially encoded modulation scheme. Thus, as shown in FIG. 3, for $\pi T/_4$-DQPSK, M would be equal to 4. Similarly, the output signal 38 of CDD 5B is fed into a bank 50 of M complex phaser multipliers. Each complex phaser multiplier in bank 45 and bank 50 multiplies the respective signal input thereto with a signal having a phase equal to a respective one of the possible M phase states of the differentially encoded signal, represented in FIG. 2 as $\beta_o \ldots \beta_{M-1}$. For $\pi/_4$-DQPSK, $\beta_o \ldots \beta_{M-1}$ are shown in column 1 of Table I.

The output signal 39 of detector 40 is fed into a bank 55 of $(M)^2$ complex phaser multipliers which represent every possible phase trajectory combination of $\Delta\Phi_k$ and $\Delta\Phi_{k-1}$. For $\pi_4$-DQPSK, would be equal to 16. Each of the outputs of the respective $(M)^2$ complex phaser multipliers of bank 55 is then summed using a complex adder 52 with the respective corresponding outputs of the M complex phaser multipliers of banks 45 and 50 to create $(M)^2$ error signals $\xi$. By corresponding outputs, it is meant those outputs of the M complex phaser multipliers of banks 45 and 50 that would produce the phase trajectory combination of the respective complex phaser multiplier of bank 55. For simplicity, only one complex adder 52 is shown, but it should be understood that $(M)^2$ complex adders 52 are needed.

Next, the error signal $\xi$ whose real part is the largest is chosen as the output, which, for illustrative purposes, is shown in FIG. 3 to be the sum of: (1) the output of the multiplier of bank 45 whose input signal has a phase state of $\beta_j$, (2) the output of the multiplier of bank 50 whose input signal has a phase state of $\beta_m$, and (3) the output of the multiplier of bank 55 whose input signal has a phase state of $(\beta_j + \beta_m)$. Accordingly, $\Delta\Phi_{k-1}$ is determined to be equal to $\beta_j$ and $\Delta\Phi_k$ is determined to be equal to $\beta_m$. Thus, if $\pi/_4$-DQPSK is being used, the symbols that correspond to $\beta_j$ and $\beta_m$ from Table I are output as the decoded digital data or symbols. Thus, in short, the CMLMSDD makes use of the MLSE of the transmitted signal rather than using the symbol-by-symbol approach of the CDD shown in FIG. 2 and does so by observing the received signal over N signal intervals $T_s$ and making a simultaneous decision on N-1 symbols. In particular, in the CMLMSDD shown in FIG. 3, N is equal to three and thus a simultaneous decision is made on two symbols.

However, as can be seen in FIG. 3, the CMLMSDD requires that the operations be carried out as complex additions and complex multiplications. Furthermore, each complex multiplication requires four real multiplications and two real additions. Thus, the necessity of performing complex additions and complex multiplications adds to both the complexity and cost of the differential detector, whether it is implemented in hardware or software. In particular, the complex additions and complex multiplications require more computation and more memory than if only real numbers and real computations were involved.

SUMMARY OF THE INVENTION

A differential detection scheme is described which differentially detects a differentially encoded symbol by first calculating a predetermined number of phases of the encoded signal at a predetermined number of times wherein the predetermined number of times are separated by a predetermined time interval. Next, a plurality of phase shifts is calculated by subtracting respective ones of the predetermined number of phases from respective other ones of a plurality of phase state values to produce a plurality of sets of a plurality of first outputs. A sum of the phase shifts is subtracted from each of a plurality of phase state combination values to produce a plurality of second outputs. A plurality of errors is calculated where each error includes a sum of respective ones of the first outputs, each respective one of the first outputs being from a respective one of the sets of first outputs, and a respective one of the second outputs, and determining a minimum of the errors, the minimum error including a sum of particular ones of the first and second outputs, the particular ones of the first outputs being generated using particular ones of the phase state values. Finally, a plurality of symbols is output wherein each symbol corresponds to a respective one of the particular ones of the phase state values. Also described is an apparatus for implementing the differential detection scheme of the present invention.

DETAILED DESCRIPTION OF THE PREFERRED EMBODIMENTS

Figure 1A:
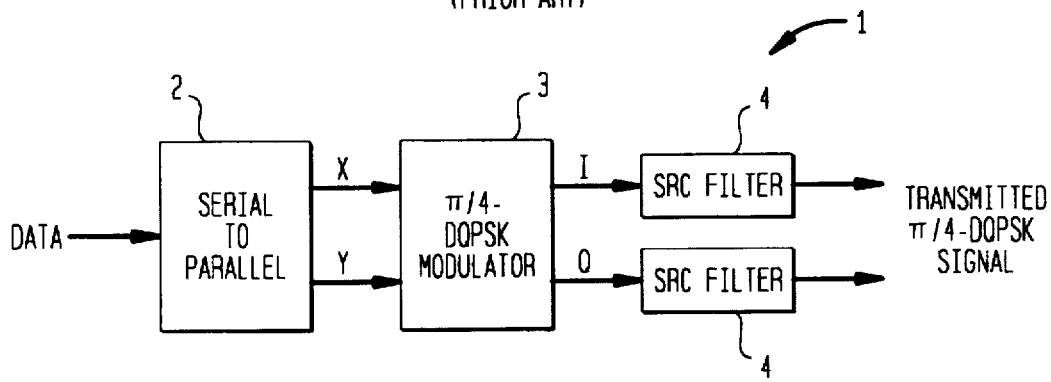
FIG. 1A is a block diagram of a conventional transmitter.
Figure 1B:
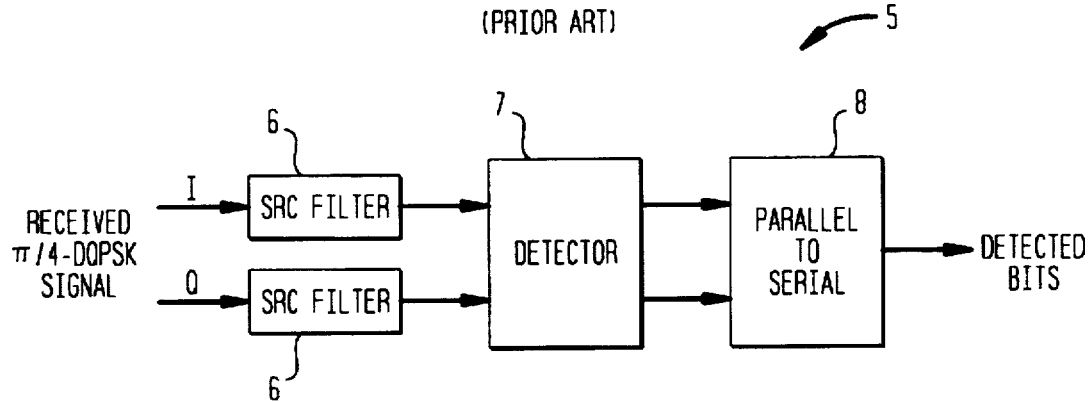
FIG. 1B is a block diagram of a conventional receiver.
Figure 2:
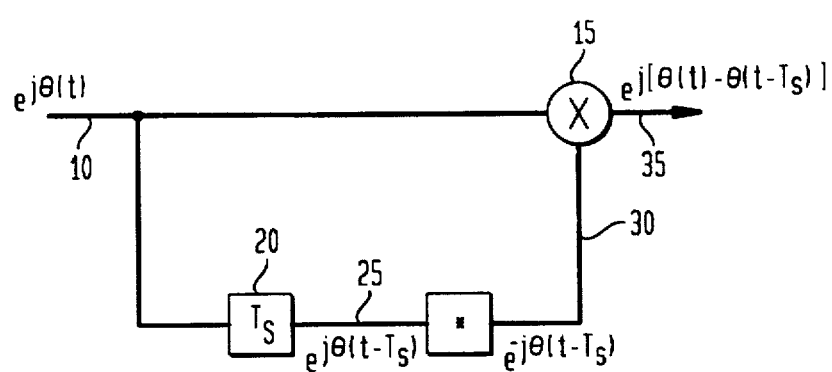
FIG. 2 is a schematic representation showing an implementation of a conventional differential detector.
Figure 3:
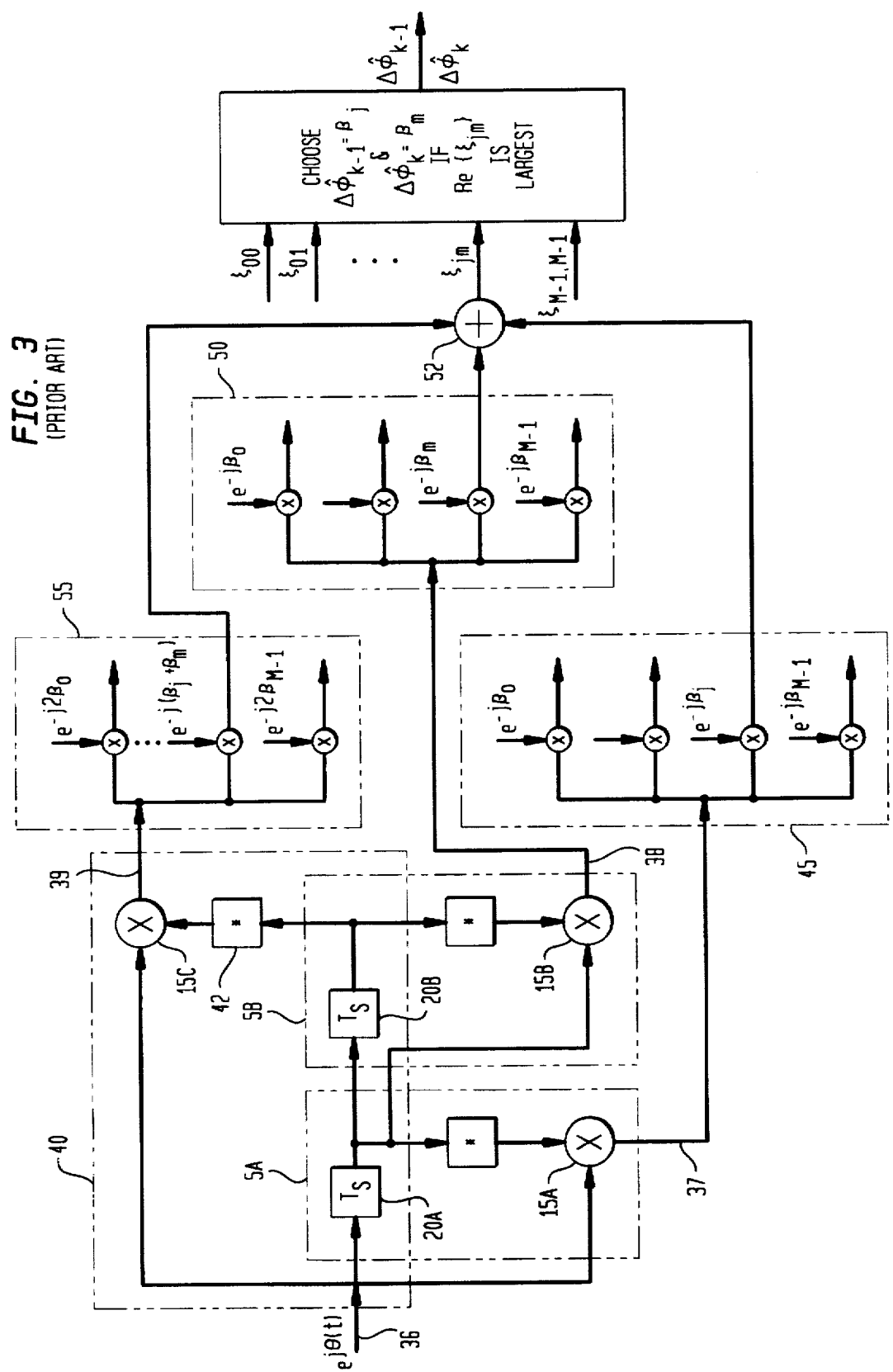
FIG. 3 is a schematic representation showing an implementation of a conventional maximum likelihood multiple symbol differential detector.
Figure 4:
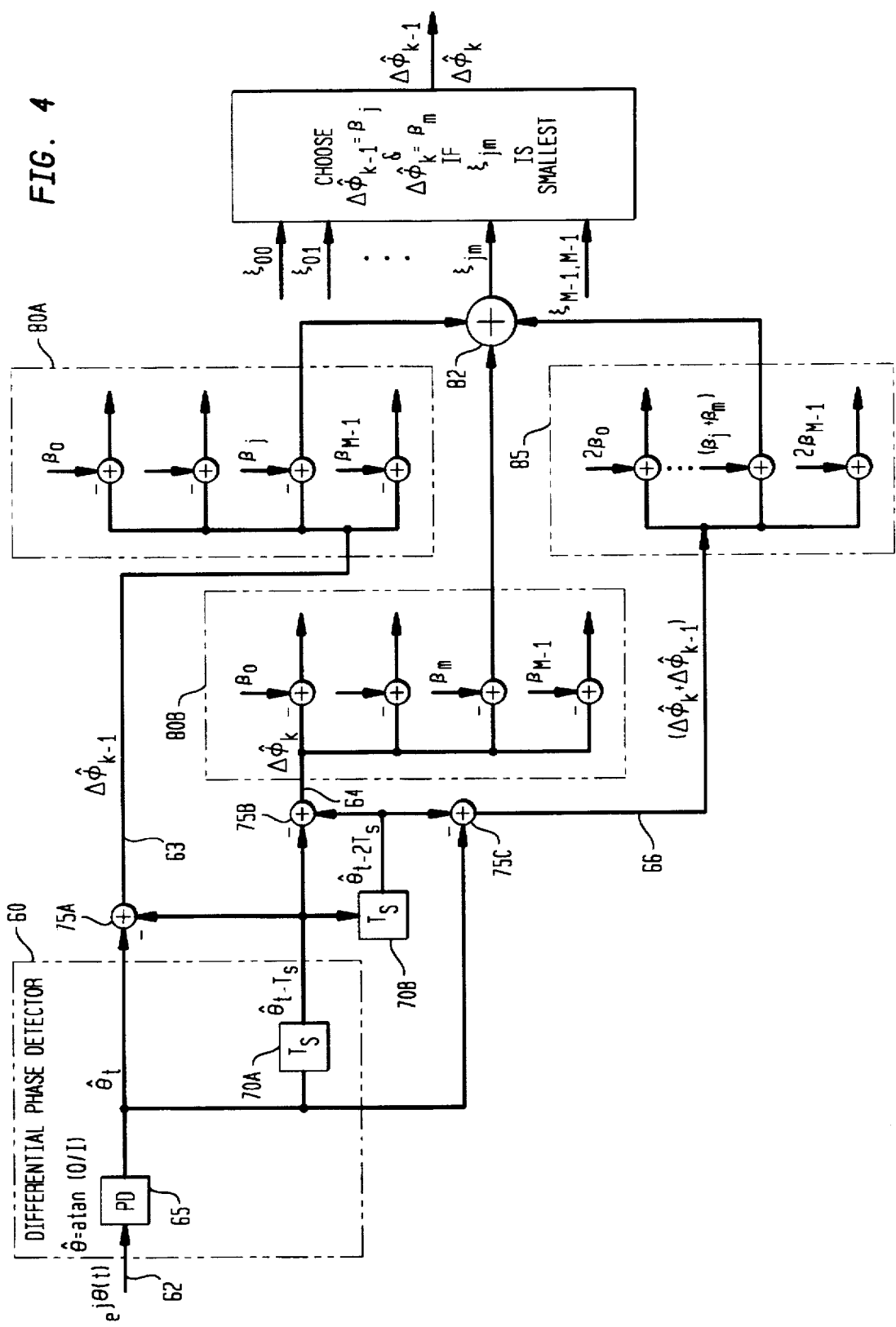
FIG. 4 is a schematic representation showing an implementation of the reduced complexity maximum likelihood multiple symbol differential detector according to an aspect to the present invention.

Referring to FIG. 4, a schematic representation of a Reduced Complexity Maximum Likelihood Multiple Symbol Differential Detector, or RCMLMSDD, according to an aspect of the present invention is shown. The RCMLMSDD is provided with a differential phase detector, or DPD, 60. The DPD 60 takes as its input a differentially encoded transmitted signal 62, represented as $e^{j\Theta(t)}$. Using Euler's identity, the input signal 62 can also be written as $\cos\Theta(t) + j\sin\Theta(t)$. The complex $\pi/4$-DQPSK input signal 62 can be written as I+jQ, where I and Q are the quadrature baseband components.

DPD 60 includes a phase detector 65 which calculates the phase of the input signal 62 using the trigonometric arctangent function. Specifically, the phase of the input signal 62 is equal to $\tan^{-1}$ (Q/I).

In DPD 60, the phase of the input signal 62 is calculated by phase detector 65 and is stored for a time period equal to signal interval $T_s$. This operation is shown schematically in FIG. 4 by time delay 70A and the time delayed phase is shown as $\hat{\Theta}_{t-T_s}$. After the time period $T_s$ has elapsed, the phase of the input signal 62 is again calculated by phase detector 65 and is shown in FIG. 4 as $\hat{\Theta}_t$. These two phases, $\hat{\Theta}_t$ and $\hat{\Theta}_{t-T_s}$, are then fed into real subtractor 75A. Thus, the output 63 of real subtractor 75A, and consequently the output of DPD 60, is the phase difference between the input signal 62 at time t-$T_s$ and the input signal 62 at time t, represented in FIG. 4 as $\Delta\Phi_{k-1}$.

The RCMLMSDD is also provided with second time delay 70B and second real subtractor 75B. Time delay 70B takes as its input the phase $\hat{\Theta}_{t-T_s}$ and real subtractor 75B takes as its input the respective outputs of time delays 70A and 70B. Thus, as can be seen in FIG. 4, the output 64 of real subtractor 75B is the phase difference between the input signal at time t-2Ts and the input signal at time t-Ts, shown in FIG. 4 as $\Delta\Phi_k$. Finally, the RCMLMSDD is provided with a third real subtractor 75C which takes as its inputs the respective outputs of phase detector 65 and time delay 70B. Thus, as can be seen in FIG. 4, the output 66 of real subtractor 75C is the phase difference between the input signal at time t-2Ts and the input signal at time t, or, in other words, $(\Delta\Phi_k + \Delta\Phi_{k-1})$.

The output 63 of real subtractor 75A is fed into a bank 80A of M real subtractors, where M equals the possible number of phase states for the particular differentially encoded modulation scheme used. In addition, each of the M different phase states are input into respective ones of the subtractors and are represented by $\beta_o \ldots \beta_{M-1}$. As shown in Table I, for $\pi/4$-DQPSK, the possible phase states are $\pi/4$, $-\pi/4$, $3\pi/4$, $3\pi/4$ and $-3\pi/4$. Similarly, the output 64 of real subtractor 75B is fed into bank 80B of M real subtractors where, as in bank 80A, each of the M different phase states are input into respective ones of the real subtractors. Finally, the output 66 of subtractor 75C is fed into a bank 85 of (M)$^2$ real subtractors, where (M)$^2$ equals every possible phase trajectory combination of $\Delta\Phi_k$ and $\Delta\Phi_{k-1}$. By every possible phase trajectory combination it is meant all of the possible combinations of $\Delta\Phi_k$ and $\Delta\Phi_{k-1}$ as a sum. For $\pi$/hd 4-DQPSK, (M)$^2$ equals 16. Thus, input into respective ones of the (M)$^2$ real subtractors of bank 85 are each of the phase trajectory combinations.

The outputs of each of the real subtractors of bank 85 are summed using real adder 82 with the output of a respective corresponding real subtractor from bank 80A and the output of a respective corresponding real subtractor from bank 80B to create (M)$^2$ error signals $\xi$ such that each of the possible combinations of the M phase states of bank 80A and the M phase states if bank 80B are coupled with the appropriate combination of the phase states from bank 85. For simplicity, only one real adder 82 is shown, but it should be understood that (M)$^2$ real adders 82 are needed to calculate (M)$^2$ error signals $\xi$.

After each of the error signals $\xi$ are calculated, then the smallest error is determined and is considered to correspond to the output. For illustrative purposes, the smallest error in FIG. 4 is shown to be the sum of: (1) the output of the real subtractor of bank 80A whose phase state input is $\beta_j$, (2) the output of the real subtractor of bank 80B whose phase state input is $\beta_m$, and (3) the output of the real subtractor of bank 85 whose phase combination input is equal to $(\beta_j + \beta_m)$. Thus, it can be determined that $\beta\Phi_{k-1}$ is equal to $\beta_j$ and $\Delta\Phi_k$ is equal to $\beta_m$. Using a look-up table such as Table I, these phase differences $\Delta\Phi_{k-1}$ and $\Delta\Phi_k$ can be converted to the appropriate two-bit symbol 00, 01, 10 or 11.

As can be seen from FIG. 4 and the above description, because the RCMLMSDD works in the polar coordinate system using phases rather than the cartesian coordinate system, it involves only real additions and subtractions as opposed to the CMLMSDD, which involves complex additions and complex multiplications. Thus, the RCMLMSDD requires less computation and less memory than the CMLMSDD and accordingly can be implemented, whether it be in hardware or software, more easily and less expensively than the CMLMSDD.

As has been stated above, the figures provided herein are meant to aid in the understanding of the invention by providing a schematic representation of a preferred embodiment thereof. It is to be understood that the invention described herein can be implemented in various ways using hardware, software, or a combination thereof. For example, real subtractors 75 shown in FIG. 4 can be implemented using conventional flip-flops and the look-up tables used to convert $\Delta\Phi_{k-1}$ and $\Delta\Phi_k$ to the appropriate digital data symbol can be implemented using memory such as RAM. Also, the arctangent function of phase detector 65 can be implemented using a series approximation, a Taylor series expansion or a table look-up procedure and the time delays 70 can be implemented by storing phase data in a memory such as RAM and subsequently retrieving the data after the appropriate time period has elapsed. Finally, the RCMLMSDD can be implemented using only software in a digital signal processor or in a general purpose computer having a processor and memory.

While presently preferred embodiments of the invention have been disclosed, it is to be understood that the invention is not limited thereto, but that many modifications will be apparent to those of skill in the art. For example, although the RCMLMSDD has been described herein utilizing a three symbol observation window, it is to be understood that the observation window can be expanded further to four or more symbols without deviating from the scope of the invention as defined by the appended claims.

What is claimed is:

1. A method of differentially detecting a differentially encoded signal, comprising the steps of:

calculating a first phase of said encoded signal at a first predetermined time, a second phase of said encoded signal at a second predetermined time, and a third phase of said encoded signal at a third predetermined time, said first predetermined time and said second predetermined time, and said second predetermined time and said third predetermined time being each separated by a predetermined time interval;

calculating a first phase shift by subtracting said first phase from said second phase and a second phase shift by subtracting said second phase from said third phase;

subtracting said first phase shift from each of a plurality of first phase state values to produce a plurality of first outputs and subtracting said second phase shift from each of a plurality of second phase state values to produce a plurality of second outputs;

subtracting a sum including said first phase shift and said second phase shift from each of a plurality of phase state combination values to produce a plurality of third outputs;

calculating a plurality of errors, each said error including a sum of respective ones of said first, second and third outputs, and determining a minimum of said errors, said minimum error including a sum of a particular first output, a particular second output and a particular third output, said particular first output being generated using a particular one of said first phase state values and said particular second output being generated using a particular one of said second phase state values; and outputting a first symbol corresponding to said particular first phase state value and a second symbol corresponding to said particular second phase state value.

2. A method according to claim 1, wherein said first, second and third phases are calculated using an arctangent function.

3. A method according to claim 1, wherein said predetermined time interval is equal to a signal interval used to transmit said encoded signal.

4. A method according to claim 1, wherein said first phase state values and second phase state values are the same.

5. A method according to claim 4, wherein said first phase state values and said second phase state values equal $\pi/4$, $-\pi/4$, $3\pi/4$ and $-3\pi/4$.

6. A method according to claim 1, wherein said phase state combination values comprise all of the possible phase trajectory combinations of said first phase state values and said second phase state values.

7. A method according to claim 1, wherein said first symbol and said second symbol comprise digital data.

8. A method according to claim 7, wherein said digital data comprises two bits of information selected from the group consisting of 00, 01, 10 and 11.

9. A method of differentially detecting a differentially encoded symbol, comprising the steps of:

calculating a predetermined number of phases of said encoded signal at a predetermined number of times, each of said predetermined number of times being separated by a predetermined time interval;

calculating a plurality of phase shifts by subtracting respective ones of said predetermined number of phases from respective other ones of said predetermined number of phases;

subtracting respective ones of said phase shifts from respective ones of a plurality of phase state values to produce a plurality of sets of a plurality of first outputs;

subtracting a sum of said phase shifts from each of a plurality of phase state combination values to produce a plurality of second outputs;

calculating a plurality of errors, each said error including a sum of respective ones of said first outputs, each said respective one of said first outputs being from a respective one of said sets of first outputs, and a respective one of said second outputs, and determining a minimum of said errors, said minimum error including a sum of particular ones of said first and second outputs, said particular ones of said first outputs being generated using particular ones of said phase state values; and outputting a plurality of symbols, each said symbol corresponding to a respective one of said particular ones of said phase state values.

10. A method according to claim 9, wherein said predetermined number of phases are calculated using an arctangent function.

11. A method according to claim 9, wherein said predetermined time interval is equal to a signal interval used to transmit said encoded signal.

12. A method according to claim 9, wherein said phase state values equal $\pi/4$, $-\pi/4$, $3\pi/4$ and $-3\pi/4$.

13. A method according to claim 9, wherein said symbols comprise digital data.

14. A method according to claim 13, wherein said digital data comprises two-bits of information selected from the group consisting of 00, 01, 10 and 11.

15. An apparatus for differentially detecting a differentially encoded signal, comprising:

means for calculating a predetermined number of phases of said encoded signal at a predetermined number of times, each of said predetermined number of times being separated by a predetermined time interval;

a plurality of first flip-flops for calculating a plurality of phase shifts by subtracting respective ones of said predetermined number of phases from respective other ones of said predetermined number of phases;

a plurality of second flip-flops for subtracting respective ones of said phase shifts from respective ones of a plurality of phase state values to produce a plurality of sets of a plurality of first outputs;

a plurality of third flip-flops for subtracting a sum of said phase shifts from each of a plurality of phase state combination values to produce a plurality of second outputs;

means for calculating a plurality of errors, each said error including a sum of respective ones of said first outputs, each said respective one of said first outputs being from a respective one of said sets of first outputs, and a respective one of said second outputs, and means for determining a minimum of said errors, said minimum error including a sum of particular ones of said first and second outputs, said particular ones of said first outputs being generated using particular ones of said phase state values; and means for outputting a plurality of symbols, each said symbol corresponding to a respective one of said particular ones of said phase state values.

16. An apparatus according to claim 15, wherein said means for calculating a predetermined number of phases utilizes an arctangent function.

17. An apparatus for differentially detecting a differentially encoded signal, comprising:

means for calculating a predetermined number of phases of said encoded signal at a predetermined number of times, each of said predetermined number of times being separated by a predetermined time interval;

means for calculating a plurality of phase shifts by subtracting respective ones of said predetermined number of phases from respective other ones of said predetermined number of phases;

means for subtracting respective ones of said phase shifts from respective ones of a plurality of phase state values to produce a plurality of sets of a plurality of first outputs;

means for subtracting a sum of said phase shifts from each of a plurality of phase state combination values to produce a plurality of second outputs;

means for calculating a plurality of errors, each said error including a sum of respective ones of said first outputs, each said respective one of said first outputs being from a respective one of said sets of first outputs, and a respective one of said second outputs, and means for determining a minimum of said errors, said minimum error including a sum of particular ones of said first and second outputs, said particular ones of said first outputs being generated using particular ones of said phase state values; and means for outputting a plurality of symbols, each said symbol corresponding to a respective one of said particular ones of said phase state values.

18. An apparatus according to claim 17, wherein said means for calculating a predetermined number of phases utilizes an arctangent function.

* * * * *